V. C. McLAIN.
TIRE RIM SETTER.
APPLICATION FILED NOV. 11, 1915.
1,218,881.
Patented Mar. 13, 1917.
2 SHEETS—SHEET 1.
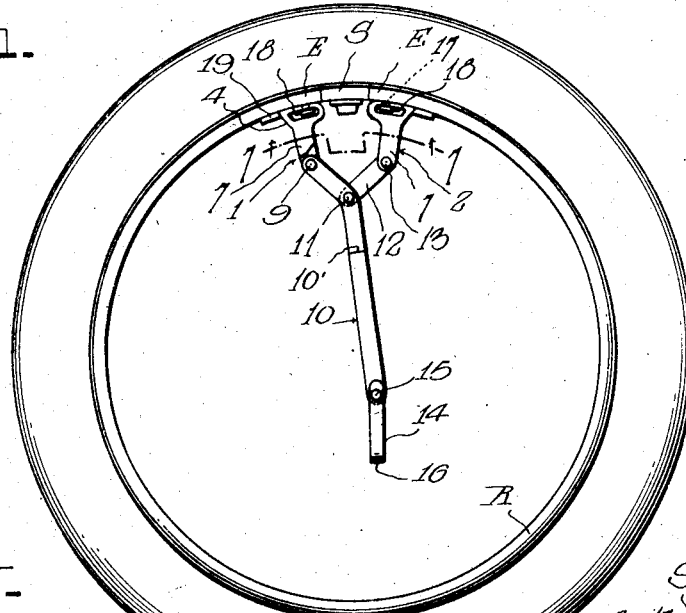
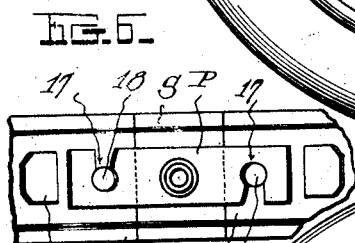
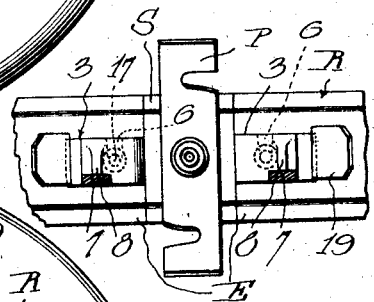
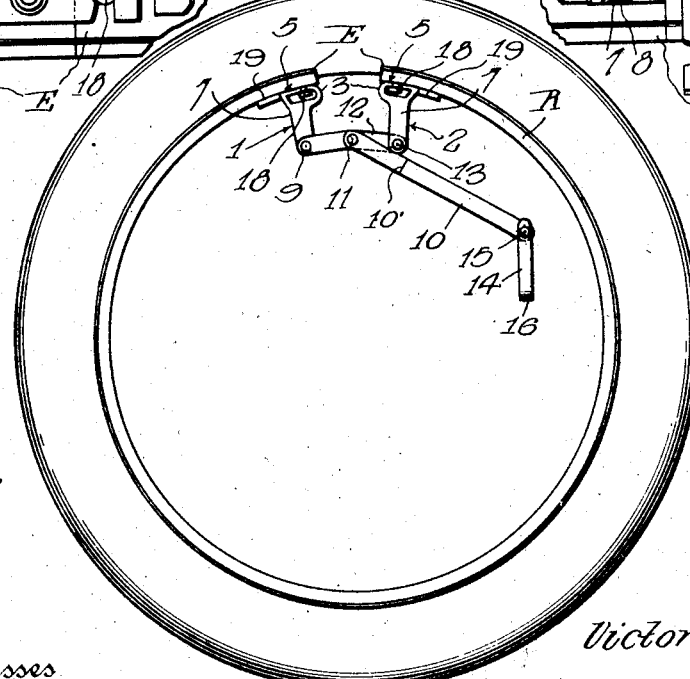
Witnesses
Inventor
Victor C. McLain
By H. B. Willson & Co
Attorneys

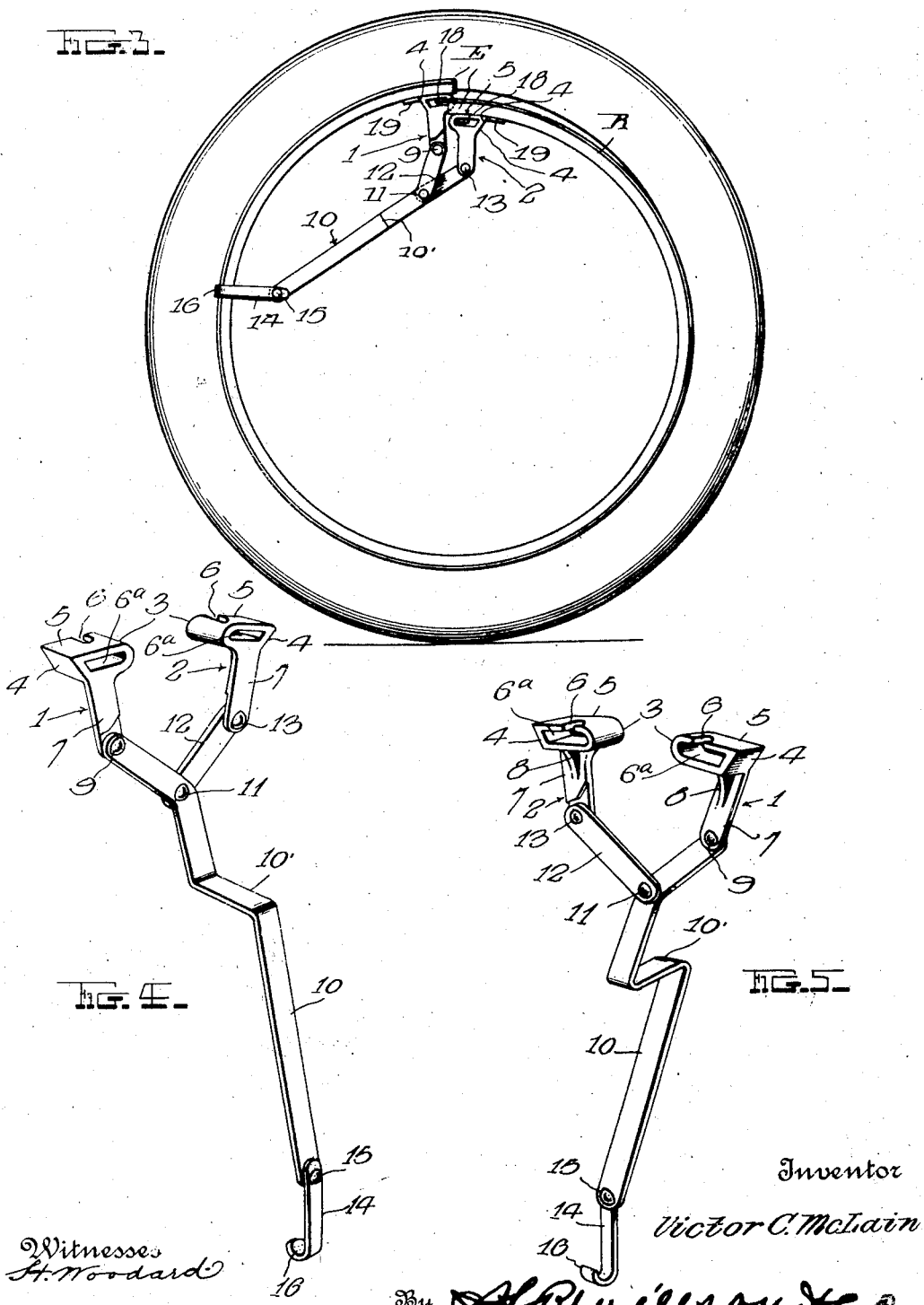

UNITED STATES PATENT OFFICE.

VICTOR C. McLAIN, OF EAST MOLINE, ILLINOIS, ASSIGNOR TO E. J. BRONSON, OF EAST MOLINE, ILLINOIS.

TIRE-RIM SETTER.

1,218,881.

Specification of Letters Patent.

Patented Mar. 13, 1917.

Application filed November 11, 1915. Serial No. 60,871.

*To all whom it may concern:*

Be it known that I, VICTOR C. McLAIN, a citizen of the United States, residing at East Moline, in the county of Rock Island and State of Illinois, have invented certain new and useful Improvements in Tire-Rim Setters; and I do declare the following to be a full, clear, and exact description of the invention, such as will enable others skilled in the art to which it appertains to make and use the same.

This invention relates to improvements in tire rim setters of the general class shown in my copending U. S. application, Serial No. 30,082 filed May 24, 1915, the device being adapted to be used in connection with a split demountable rim having pins extending radially from the inner side thereof.

One object of the invention is to provide a tire rim setter having improved rim engaging means.

A still further object resides in the provision of a device which will be simple, strong, durable and inexpensive to manufacture, efficient and reliable in operation, and well adapted to the purpose for which it is designed.

With these and other objects in view, the invention consists of certain novel features of construction and combination and arrangement of parts which will be hereinafter fully described and claimed.

In the accompanying drawings in which similar reference characters designate like parts throughout the several views, Figure 1 is a side elevation of a split demountable rim having a device constructed in accordance with this invention applied thereto, showing the device in its inoperative position;

Fig. 2 is a similar view showing the device in its operative position when the rim is expanded;

Fig. 3 is a similar view showing the operative position of the device when the rim is contracted;

Fig. 4 is a perspective view of the rim setter from one side thereof;

Fig. 5 is a similar view from the other side thereof;

Fig. 6 is a bottom plan view showing the ends of the rim and the locking means therefor; and Fig. 7 is a sectional view taken on the line 7—7 of Fig. 1.

The preferred embodiment of this invention comprises a pair of rim grips 1 and 2, which include attaching feet 3 having flat outer faces 5 adapted to bear on the inner face of a split rim at the ends thereof, said feet having apertures 6ª formed therethrough and opening through their opposed side edges. Notches 6 lead from these apertures to the faces 5 and open through one of said side edges to the feet as shown, these apertures and notches being adapted to receive headed studs on the rim. The remote ends of the feet 3 are beveled to form toes 4 which are designed to be received under the undercut edges of lugs on the rim as will be hereinafter fully described.

Projecting laterally from the inner face of each of the feet 3 is a post 7, the latter being cast in one piece with the former and braced or strengthened by a web 8 which extends from the foot 3 at one side of the post 7.

Pivoted at 9 to the free end of one of the posts 7 is one end of a lever 10. This lever 10 is bent angularly at a point spaced from said end thereof and has its other end offset laterally at a point substantially midway of its ends as at 10'. Pivoted at 11 to the bend of the lever 10 is one end of a link 12, the other end of which is pivoted at 13 to the free end of the other post 7.

The free end of the lever 10 is provided with a locking member composed of a link 14 which is pivoted at 15 to the lever 10. The free end of the link 14 is bent upon itself to form a hook 16.

The device is used in connection with a split demountable rim R, the ends E of which abut the opposite ends of a rim section S. These ends E are provided with pins 17 which project radially from the inner side thereof, said pins being provided with heads 18. Disposed adjacent the pins 17 are lugs 19 with undercut ends. Pivoted to the inner side of the rim section S is a locking plate P having notches in its opposite sides which receive the pins 17 when the plate P is swung into alinement with the rim R.

In operation, the plate P is disengaged from the pins 17 and the grips 1 and 2 are engaged with the ends E, the notches 6 receiving said pins 17, the heads 18 of the latter being received in the apertures 6ª. The toes 4 are received beneath undercut edges of the lugs 19 to prevent the feet 3 from swinging transversely as can be readily understood from Fig. 7 of the drawings, and also to prevent all strain from falling upon the headed pins 17. It may be seen that the grips 1 and 2 are thus firmly held to the ends E, and from this position, which is the position shown in Fig. 1, the lever 10 is swung to the right to the position shown in Fig. 2, and retained in that position, the pivot 11 passing beyond dead center and the lever 10 resting against the lower end of the post 7. This causes the grips 1 and 2 and the ends E to be moved away from each other, so as to enable the removal of the rim section S. When this has been done, the rim is swung to the left to the position shown in Fig. 3, and locked, the hook 11 engaging the edge of the rim R. The ends E are, by this latter movement, brought together, thus contracting the rim R to facilitate the easy removal of the tire T and the substitution of a new one therefor. By reversing the above described operation, the rim section S may be replaced.

From the foregoing, taken in connection with the accompanying drawings, it may be seen that although a very simple tool has been provided for carrying out the objects of the invention, the same will be very efficient in operation and will possess the advantages over the ones now in use in that the device may be locked when the rim is either in its contracted or expanded position. An improved rim grip has been also provided which insures a firm grip on the ends of the rim.

Various minor changes in form and proportion may be resorted to without departing from the spirit of this invention and hence I do not wish to be limited to the construction herein shown and described other than that set forth in the appended claims.

I claim:—

1. A rim tool of the class described comprising a pair of feet adapted to bear on the inner face of a split rim at the ends thereof, said feet having apertures to receive studs projecting inwardly from the ends of the rim and also having toes for reception under undercut lugs on said ends of the rim, whereby said feet may be held against rocking around the studs, rigid projections extending from the feet beyond their inner sides, and means connected with said projections for moving said feet toward or away from each other.

2. A rim tool of the class described comprising a pair of one-piece feet having flat outer faces to bear against the inner face of a split rim at the ends thereof, said feet having formed therethrough apertures which open through the side edges thereof, said feet also having notches opening through one of said edges and leading from said apertures to the aforesaid outer faces of the feet, said notches being adapted to receive pins projecting from the ends of the rim and the apertures being adapted to receive the heads of said pins, rigid posts formed integrally with and extending from the inner sides of the feet, and means pivotally connected with the free ends of said posts for moving the latter toward or away from each other.

3. A rim tool of the class described comprising a pair of attaching feet adapted to bear on the inner surface of a split rim at the ends thereof, the remote ends of said feet being beveled to form toes for reception beneath undercut lugs carried by the ends of the rim, said feet having formed therethrough apertures opening through the side edges thereof and also having notches opening through one of said edges and leading from said apertures to the rim engaging faces of the feet, said notches being adapted to receive studs projecting from the ends of the rim and the apertures being adapted to receive the heads of said studs, rigid posts extending from the inner sides of the feet and formed integrally therewith, and means pivotally connected with said posts for moving the latter toward or away from each other.

4. A rim expander comprising a pair of plates adapted to bear on the inner surface of a split rim at the ends of said rim, said plates each having in one side edge a notch adapted to receive studs projecting inwardly from the aforesaid ends of the rim, a pair of rigid posts formed integrally with the aforesaid plates and extending beyond the inner faces thereof, and means pivotally connected with the free ends of said posts for moving said posts toward or away from each other.

In testimony whereof I have hereunto set my hand in presence of two subscribing witnesses.

VICTOR C. McLAIN.

Witnesses:
GERTRUDE O. LINDER,
GEO. D. LONG.

Copies of this patent may be obtained for five cents each, by addressing the "Commissioner of Patents, Washington, D. C."